United States Patent

Nishikawa

[11] Patent Number: 5,955,539
[45] Date of Patent: Sep. 21, 1999

[54] CYANOETHYL GROUP-CONTAINING GRAFT POLYMER

[75] Inventor: Satoshi Nishikawa, Shiga-ken, Japan

[73] Assignees: Sunstar Giken Kabushiki Kaisha, Osaka-fu, Japan; Uni-Sunstar B.V., Amsterdam, Netherlands

[21] Appl. No.: 09/013,262

[22] Filed: Jan. 26, 1998

[30] Foreign Application Priority Data

Jan. 24, 1997 [JP] Japan ................................. 9-011401

[51] Int. Cl.⁶ ........................ C08G 63/48; C07C 255/03
[52] U.S. Cl. ................... 525/63; 525/66; 525/88; 525/910; 525/911; 525/912; 528/422; 558/440
[58] Field of Search ................... 525/63, 66, 88, 525/910, 911, 912; 528/422; 558/440

[56] References Cited

U.S. PATENT DOCUMENTS 5,194,471 3/1993 Hartitz ..................................... 524/180
5,777,038 7/1998 Nishikawa et al. ..................... 525/295

*Primary Examiner*—Robert W. Ramswer
*Assistant Examiner*—Ebenezer Sackey
*Attorney, Agent, or Firm*—Jacobson, Price, Holman & Stern, PLLC

[57] ABSTRACT

A cyanoethyl group-containing graft polymer comprising a hydrocarbon polymer backbone comprising butadiene units, to which a cyanoethylated (meth)acrylate monomer of the formula:

$$CH_2=CR_1-COO-R_2-(OCH_2CH_2CN)_m$$

in which $R_1$ is a hydrogen atom or a methyl group; $R_2$ is a residue derived from a (m+1)-valent polyhydroxyl compound by the removal of all the hydroxyl groups; and m is an integer of at least 1, which is useful as a binder resin for positive and negative electrodes of lithium ion secondary batteries and for organic dispersion type electroluminescent device.

4 Claims, No Drawings

CYANOETHYL GROUP-CONTAINING GRAFT POLYMER

BACKGROUND OF THE INVENTION

1. Field of the Invention

The present invention relates to a cyanoethyl group-containing graft polymer. In particular, the present invention relates to a graft polymer comprising hydrocarbon polymer backbones to which cyanoethyl group-containing side chains are grafted, which has a high dielectric constant and a high ionic conductivity. Such a graft polymer is useful as a binder resin for positive and negative electrodes of lithium ion secondary batteries or for organic dispersion type electroluminescent (EL) devices.

2. Prior Art

Binder resins for electrodes of lithium ion secondary batteries should have good ionic conductivity and also good resistance to a polar solvent (e.g. ethylene carbonate, propylene carbonate, etc.) which is a main component of an electrolyte (hereinafter referred to as "polar solvent resistance" and high adhesion to metal surfaces of electrode collectors.

However, it is difficult for binder resins to have all of such required properties. Thus, fluororesins such as polyvinylidene fluoride resins are unavoidably used. Such resins have low ionic conductivity and poor adhesion to the metal surfaces of collectors, although they have good polar solvent resistance. The ionic conductivity has a large influence on the internal resistance of batteries. Therefore, it is desired to decrease the internal resistance as much as possible to improve the large current discharge properties of the lithium ion secondary batteries and to decrease discharge loss. However, the lithium ion batteries have a larger internal resistance than other secondary batteries such as nickel-cadmium secondary batteries or nickel-hydrogen secondary batteries. This is one of the disadvantages of the lithium ion secondary batteries.

It is desirable for binder resins to have a molecular structure with high polarity, and a high dielectric constant to impart good ionic conductivity to the binder resins for electrodes, but polymers having high polarity have in general low polar solvent resistance. For example, conventional polymers comprising polyoxyethylene backbones or having cyanoethyl groups, which are known to have good ionic conductivity, have very low polar solvent resistance, and thus cannot be used practically. Accordingly, the ionic conductivity and polar solvent resistance are directly opposed properties, and are less compatible.

SUMMARY OF THE INVENTION

An object of the present invention to provide a graft polymer which has good polar solvent resistance and ionic conductivity.

Another object of the present invention is to provide a binder resin suitable for electrodes of lithium ion secondary batteries, for organic dispersion type electroluminescent devices, or for capacitors.

Accordingly, the present invention provides a cyanoethyl group-containing graft polymer comprising a hydrocarbon polymer backbone comprising butadiene units, to which a cyanoethylated (meth)acrylate monomer of the formula:

wherein $R_1$ is a hydrogen atom or a methyl group; $R_2$ is a residue derived from a (m+1)-valent polyhydroxyl compound by the removal of all the hydroxyl groups; and m is an integer of at least 1.

This monomer of the formula (I) will be referred to as "cyanoethyl monomer").

DETAILED DESCRIPTION OF THE INVENTION

The hydrocarbon polymers constituting the backbones of the graft polymers of the present invention comprise butadiene monomeric units. That is, the hydrocarbon polymers are a homopolymer of butadiene, and copolymers of butadiene with at least one copolymerizable monomer (e.g. styrene, etc.). The copolymers may be random or block copolymers. Preferably, the polymer molecules consist of hydrocarbons, although they may partly contain non-hydrocarbon monomeric units. Preferable examples of such hydrocarbon polymers are polybutadiene, styrene-butadiene copolymers, styrene-butadiene-styrene block copolymers, styrene-butadiene block copolymers, and the like.

The monomeric units derived from butadiene may be 1,2-bonding or 1,4-bonding ones. The hydrocarbon polymers include rubbery elastic polymers having a molecular weight of several ten thousand to several million, and thermoplastic resins.

It may be contemplated to use polymers comprising monomeric units derived from monomers having conjugated double bonds such as isoprene, chloroprene, and the like, except for the butadiene monomeric units. In this case, the graft degree of the above cyanoethyl monomer (I) tends to decrease. Thus, copolymerization of other monomers having conjugated double bonds is less preferable.

The cyanoethyl monomer (I) used in the present invention may be prepared by addition reacting one mole of a (m+1)-valent polyhydroxyl compound of the formula (II):

wherein $R_2$ and m are the same as defined above, with m moles of acrylonitrile to obtain a cyanoethyl compound of the formula (III):

wherein $R_2$ and m are the same as defined above, through the Michael addition reaction, and then esterifying the cyanoethyl compound of the formula (III) with one mole of acrylic or methacrylic acid or its chloride. Alternatively, the cyanoethyl monomer (I) may be prepared by esterifying one mole of the polyhydroxyl compound (II) with one mole of acrylic or methacrylic acid or its chloride, and then reacting the ester with m moles of acrylonitrile thought the Michael addition reaction.

The polyhydroxyl compound (II) may be any compound having at least two hydroxyl groups, preferably 2 to 6 hydroxyl groups. That is, m is at least 1, preferably from 1 to 5.

Examples of the polyhydroxyl compound (II) are ethylene glycol, diethylene glycol, triethylene glycol, tetraethylene glycol, propylene glycol, dipropylene glycol, tripropylene glycol, tetramethylene glycol, neopentyl glycol, glycerol, diglycerol, triglycerol, trimethylolpropane, hexanetriol, erythritol, pentaerythritol, dipentaerythritol, xylitol, inositol, mannitol, sorbitol, and the like. Furthermore, compounds having polyoxyethylene chains prepared by the addition of 10 moles or less of ethylene oxide per one hydroxyl group to these polyhydroxyl compounds can be used.

The cyanoethyl group-containing graft polymer according to the present invention may be prepared by graft polymerizing the cyanoethyl monomer (I) onto the above hydrocarbon polymer by any conventional method. For example, the cyanoethyl monomer (I) is radically polymerized in the presence of the hydrocarbon polymer optionally in the presence of organic solvents or other liquid mediums, by heat polymerization using radical polymerization initiators, or photopolymerization with radiation (e.g. γ-ray, electron beams, UV light, etc.).

The amount of the cyanoethyl monomer (I) used in the graft polymerization depends on the application of the obtained graft polymers.

For example, the amount of the cyanoethyl monomer (I) is between 10 and 60 wt. %, preferably between 15 and 50 wt. % based on the total weight of the hydrocarbon polymer and cyanoethyl monomer (I), when the graft polymers are used as binder reins for the positive or negative electrodes of lithium ion secondary batteries. When the amount of the cyanoethyl monomer (I) is less than 10 wt. %, sufficient ionic conductivity is not attained. When this amount exceeds 60 wt. %, the polar solvent resistance of the graft polymer tends to deteriorate.

The amount of the cyanoethyl monomer (I) is between 40 and 90 wt. %, preferably between 60 and 70 wt. % based on the total weight of the hydrocarbon polymer and cyanoethyl monomer (I), when the graft polymers are used as binder reins for organic dispersion type EL devices. In this case, no polar solvent resistance is required.

The organic solvent or other liquid medium may be any conventionally used ones other than those having adverse effects on the graft polymerization, for example, solvents having a very large chain transfer constant such as chlorohydrocarbons (e.g. carbon tetrachloride, 1,1,1-trichloroethane, etc.) or compounds having a mercapto group. In particular, solvents in which both the hydrocarbon polymer and cyanoethyl monomer (I) are dissolved, for example, aromatic hydrocarbons (e.g. xylene, toluene, etc.) are preferable for the uniform graft polymerization.

Examples of the radical polymerization initiators are peroxides (e.g. benzoyl peroxide, dicumyl peroxide, methyl ethyl ketone peroxide, dilauroyl peroxide, tert.-butyl hydroperoxide, etc.) and azo compounds (e.g. 2,2'-azobisbutyronitrile, 2,2'-azobis(4-methoxy-2,4-dimethylvaleronitrile, etc.), which are widely used for radical polymerization. The radical polymerization initiator is selected from these initiators according to the polymerization temperature, kind of the used organic solvent, and the like.

It is possible to use polymerization initiators having specific functional groups (e.g. a trimethoxysilyl group, a hydroxyl group, etc.), or polymeric initiators. In this case, graft polymers having such functional groups, or graft block polymers can be prepared.

In the case of the photopolymerization with radiation, the polymerization initiators may be benzoin ether type, benzophenone type, benzoin type, ketal type, acetophenone type, or thioxanthone type polymerization initiators, when UV light is used. The polymerization initiators are not always used, when the electron beam and γ-ray are used as the radiation, and the graft polymerization proceeds easily. However, the electron beam and γ-ray require costly equipments.

In the graft polymerization, mercaptans (e.g. n-butylmercaptan, dodecylmercaptan, cyclohexylmercaptan, etc.) may be used for the adjustment of a molecular weight or the suppression of side reactions such as crosslinking. In this case, graft polymers having specific functional groups can be prepared like in the case of the polymerization initiators having the specific functional groups.

The graft polymerization of the cyanoethyl monomer (I) onto the hydrocarbon polymers can afford good ionic conductivity and give the graft polymers having good polar solvent resistance. If necessary, other copolymerizable monomers may be used in addition to the cyanoethyl monomer (I). The amount of the copolymerizable monomer(s) should be 50 wt. % or less of the total amount of the cyanoethyl monomer (I) and copolymerizable monomer(s).

Specific examples of such copolymerizable monomers are acrylate esters (e.g. methyl acrylate, ethyl acrylate, n-butyl acrylate, cyclohexyl acrylate, 2-ethylhexyl acrylate, etc.), methacrylate esters (e.g. methyl methacrylate, ethyl methacrylate, isobutyl methacrylate, lauryl methacrylate, 2-methoxyethyl methacrylate, etc.), aromatic vinyl compounds, (e.g. styrene, vinyltoluene, vinylalkylphenols. etc.), (meth)acrylates of alicyclic and aromatic alcohols (e.g. dicyclopentenyl (meth)acrylate, tricyclodecanyl (meth)acrylate, isobornyl (meth)acrylate, etc.), fluoroalkyl (meth)acrylates (e.g. 2,2,2-trifluoroethyl (meth)acrylate, 2,2,3,3-tetrafluoropropyl (meth)acrylate, 1,1,3,3,3-pentafluoropropyl (meth)acrylate, etc.), (meth)acrylates of monoalkoxypolyalkylene glycols (e.g. diethylene glycol monomethyl ether (meth)acrylate, tetraethylene glycol monomethyl ether (meth)acrylate, tripropylene glycol monobutyl ether (meth)acrylate, etc.), (meth)acrylamide, (meth)acrylonitrile, vinyl acetate, dialkyl maleates, dialkyl itaconates, vinyl alkyl ethers, and the like.

When the copolymerizable monomers are used, graft polymers having the specific functional group can be obtained by the use of monomers having the specific functional groups such as glycidyl methacrylate, allyl glycidyl ether, γ-methacryloxypropyltrimethoxysilane, γ-methacryloxypropylmethyldimethoxysilane, 2-hydroxyethyl methacrylate, 2-hydroxyethyl acrylate, (meth)acroyl isocyanate, and the like. Also, graft polymers having the specific polymeric side chains can be obtained by the use of so-called macromonomers such as methacrylates having polystyrene side chanis or polymethyl methacrylate chains. Such monomers or macromonomers may be used according to the various properties of the graft polymers (e.g. mechanical strength, heat resistance, adhesion properties, polar solvent resistance, etc.).

When the cyanoethyl group-containing graft polymer of the present invention is used in the lithium ion secondary batteries, the graft polymer is compounded with positive electrode active materials (e.g. $LiCoO_2$, $LiMn_2O_4$, $LiNiO_2$, etc.), or negative electrode active materials (e.g. lithium ion-occlusion materials, for example, carbon materials such as graphite, carbon fiber, calcined carbon of pitch, and the like), and optionally viscosity modifiers, colorants, anti-aging agents and the like to prepare paste compositions, and then positive or negative electrodes are produced from the paste compositions.

In addition, the graft polymer of the present invention can be used as a binder resin for organic dispersion type EL devices, electrochromic devices, capacitors, solic polymer electrolytes, and the like.

EXAMPLES

The present invention will be illustrated by the following examples.

Examples 1–5

(1) Preparation of Cyanoethyl Monomer

A 2 wt. % aqueous solution of NaOH (204 g), pentaerythritol (68.0 g, 0.5 mole) and methylene chloride (136 ml, 184.7 g) were charged in a three-neck flask. Then, acrylonitrile (84.9 g, 1.6 moles) was dropwise added over 4 hours with vigorous stirring and refluxing (internal temperature of 35 to 40° C.), followed by the reaction at the same temperature for 3 hours while stirring. After the reaction, the reaction mixture was kept standing, and separated into two layers (upper layer: aqueous layer, lower layer: methylene chloride layer). The aqueous layer was discarded, and the methylene chloride layer was washed with water until its alkalinity disappeared. After that, water and methylene chloride were evaporated off with a rotary pump under reduced pressure, and tricyanoethylated pentaerythritol was obtained.

Then, methacrylic acid (52 g, 0.6 mole), p-toluenesulfonic acid (3.2 g), hydroquinone (0.03 g) (a polymerization inhibitor) and benzene (200 g) were added to the tricyanoethylated pentaerythritol (59 g, 0.2 mole), and reacted for 8 hours under refluxing while removing generated water, followed by the removal of excessive methacrylic acid with water, and tricyanoethylated pentaerythritol methacrylate (a cyanoethyl monomer) was obtained.

The IR spectrum of this cyanoethyl monomer confirmed the presence of the —CN groups and double bonds. The purity of this monomer was 96.9% according to the GC analysis.

(2) Preparation of Cyanoethyl Group-containing Graft Polymer

Components shown in Table 1 were charged in a separable flask in amounts (wt. parts) as shown in Table 1, and polymerized at 80° C. for 3 hours while introducing nitrogen gas in the flask. Thus, the slightly milky-white semitransparent solution of the graft polymer was obtained. The mixture of methanol and water (weight ratio of 1:1) was added to the polymer solution to precipitate the graft polymer, which was washed and dried for purification. The obtained polymer of each Example was a milky-white solid and had rubbery properties. The IR spectrum of the polymer had the absorption peaks assigned to the —CN groups and >C=O groups.

(3) Evaluation of Properties

The ionic conductivity, dielectric constant, dielectric dissipation factor (tan δ) and polar solvent resistance of the graft polymers were measured and evaluated as follows:

Ionic conductivity (except Example 5)

To the 20 wt. % solution of the graft polymer in toluene, the 10 wt. % solution of $LiBF_4$ in ethylene glycol monoethyl ether was added so that the amount of $LiBF_4$ reached 1.0 wt. % of the graft polymer, and the obtained mixed solution was coated on an aluminum plate so that a dry thickness became about 100 μm, and dried at 120° C. for 60 minutes. Then, aluminum was vacuum deposited on the dried layer to form electrodes for measurement, and an ionic conductivity (S/cm) was measured with a LCZ meter at the frequency of 1 KHz at room temperature.

Dielectric constant and dielectric dissipation factor

A test sample was prepared in the same manner as in the measurement of the ionic conductivity except that no $LiBF_4$ was added to the graft polymer, and then the dielectric constant and dielectric dissipation factor were measured with a LCZ meter at the frequency of 1 KHz at room temperature.

Polar solvent resistance (except Example 5)

A test sample prepared in the same manner as in the measurement of the dielectric constant and dielectric dissipation factor was dipped in propylene carbonate at 40° C. for 48 hours, and then swelling of the graft polymer was observed.

The results are shown in Table 1.

TABLE 1

| | Example No. | | | | |
|---|---|---|---|---|---|
| | 1 | 2 | 3 | 4 | 5 |
| KX-405CP | 100 | 100 | — | — | 100 |
| KX-65 | — | — | 100 | — | — |
| BR-45 | — | — | — | 100 | — |
| Cyanoethyl monomer (I) | 20 | 60 | 40 | 30 | 120 |
| BPO | 0.5 | 0.5 | 0.5 | 0.5 | 0.5 |
| Toluene | 400 | 400 | 400 | 400 | 400 |
| Ionic conductivity (S/cm) | $3.4 \times 10^{-6}$ | $6.6 \times 10^{-5}$ | $4.8 \times 10^{-6}$ | $5.6 \times 10^{-6}$ | — |
| Dielectric constant | 5.62 | 9.23 | 7.59 | 6.61 | 12.20 |
| Dielectric dissipation factor | 0.002 | 0.004 | 0.005 | 0.003 | 0.008 |
| Polar solvent resistance | No swelling | No swelling | No swelling | No swelling | — |

Notes: KX-405CP and KX-65: Styrene-butadiene-styrene (SBS) copolymers (Kryton D grades, both available from Shell Chemical Co., Ltd.).
BR-454: Polybutadiene rubber (available from Asahi Chemical Co., Ltd.).
BPO: Benzoyl peroxide.

Comparative Examples 1 and 2

The properties of a hydrocarbon polymer on which no cyanoethyl monomer (I) had been graft polymerized (Comparative Example 1) or a polyvinylidene fluoride which is widely used as a binder resin for electrodes (Comparative Example 2) were measured in the same manner as in Examples 1–5. The results are shown in Table 2.

The hydrocarbon polymer used in Comparative Example 1 was a SBS copolymer (Kryton D KX-405CP) in the form of a 20 wt. % solution in toluene, and polyvinylidene fluoride in Comparative Example 2 was used in the form of a 15 wt. % solution in methypyrrolidone. For the measurement of the ionic conductivity, the 10 wt. % solution of $LiBF_4$ in ethylene glycol monoethyl ether was added so that the amount of $LiBF_4$ reached 1.0 wt. % of the polymer like in Examples.

TABLE 2

| | Comp. Ex. 1 | Comp. Ex. 2 |
|---|---|---|
| Ionic conductivity (S/cm) | $4.5 \times 10^{-12}$ | $8.6 \times 10^{-12}$ |
| Dielectric constant | 2.65 | 9.67 |
| Dielectric dissipation factor | 0.002 | 0.003 |
| Polar solvent resistance | No swelling | No swelling |

As seen from the results in Tables 1 and 2, the graft polymers of the present invention have good properties suitable as binder resins for the electrodes of lithium ion secondary batteries (Examples 1–4) and as binder resins with a high dielectric constant for the organic dispersion type EL devices.

What is claimed is:

1. A cyanoethyl group-containing graft polymer comprising a hydrocarbon polymer backbone to which a cyanoethylated (meth)acrylate monomer is grafted;

the hydrocarbon polymer backbone comprising butadiene units, and the cyanoethylated (meth)acrylate monomer being of the formula:

$$CH_2=CR_1—COO—R_2—(OCH_2CH_2CN)_m \quad (1)$$

wherein $R_1$ is a hydrogen atom or a methyl group;
$R_2$ is a residue derived from an (m+1)-valent polyhydroxyl compound by removal of all hydroxyl groups; and
m is an integer of at least 1.

2. A cyanoethyl group-containing graft polymer according to claim 1, wherein said hydrocarbon polymer is at least one polymer selected from the group consisting of polybutadiene, a styrene-butadiene copolymer, a styrene-butadiene-styrene block copolymer and a styrene-butadiene block copolymer.

3. The cyanoethyl group-containing graft polymer according to claim 1, wherein an amount of said cyanoethylated (meth)acrylate monomer is between 10 and 60 wt. % of the total amount of said cyanoethylated (meth)acrylate monomer and said hydrocarbon polymer.

4. The cyanoethyl group-containing graft polymer according to claim 1, wherein an amount of said cyanoethylated (meth)acrylate monomer is between 40 and 90 wt. % of the total amount of said cyanoethylated (meth)acrylate monomer and said hydrocarbon polymer.

* * * * *